United States Patent [19]

Ohtsuka

[11] Patent Number: 5,684,381

[45] Date of Patent: Nov. 4, 1997

[54] CHARGE DEVICE REDUCED IN SIZE AND POWER CONSUMPTION

[75] Inventor: Shouichiro Ohtsuka, Tokyo, Japan

[73] Assignee: NEC Corporation, Tokyo, Japan

[21] Appl. No.: 580,390

[22] Filed: Dec. 28, 1995

[30] Foreign Application Priority Data

Jan. 4, 1995 [JP] Japan ..................... 7-000070

[51] Int. Cl.$^6$ ..................................... H02J 7/00
[52] U.S. Cl. ..................... 320/5; 320/15; 320/2; 320/30
[58] Field of Search ................... 320/30, 31, 32, 320/27, 28, 5, 2, 15

[56] References Cited

FOREIGN PATENT DOCUMENTS

588727 A1  3/1994  European Pat. Off. ........... H02J 7/00

*Primary Examiner*—Peter S. Wong
*Assistant Examiner*—K. Shin

*Attorney, Agent, or Firm*—Whitham, Curtis, Whitham & McGinn

[57] ABSTRACT

A pair of power supply terminals have parallel-connected therebetween an adapter and a serial connection of a battery and a power MOS circuit composed of a multiplicity of switching and current-limiting MOS transistors of which a particular one has a resistor interconnected between a source electrode thereof and one of the power supply terminals to provide a current detection signal representative of a fraction of a charge or discharge current passing the MOS circuit, and which are controlled with a bias voltage selected between one of potentials at the power supply terminals and an output of a comparator comparing the current direction signal with a reference voltage, in accordance with a level combination control signals output from a control circuit in response to a detection signal representative of a battery voltage and a detection signal representative of a connection state between the adapter and an outlet, permitting a reduced device size and a reduced power consumption.

11 Claims, 6 Drawing Sheets

| Cases of use | Detection signals | | Control signals | | | SW CCT | Battery 1 |
|---|---|---|---|---|---|---|---|
| | D15 | D16 | C17 | C18 | C19 | CLS | |
| Normal, 1st | High | High | Low | High | Low | off | — |
| Normal, 2nd | High | Low | High | Low | Low | on | Discharge |
| Critical, 1st | Low | High | Low | Low | High | on | Charge |
| Critical, 2nd | Abnormal | Low | Low | High | Low | off | — |

FIG. 3 PRIOR ART

| Cases of use | Detection signals | | Control signals | | Switching signals | | Battery 1 |
|---|---|---|---|---|---|---|---|
| | D15 | D16 | C34 | C35 | Sw1 | Sw2 | |
| Normal, 1st | High | High | High | Low | off | off | — |
| Normal, 2nd | High | Low | High | High | off | on | Discharge |
| Critical, 1st | Low | High | Low | Low | on | off | Charge |
| Critical, 2nd | Ab-normal | Low | High | Low | off | off | — |

F I G. 6

| Cases of use | Detection signals | | Control signals | | | SW CCT | Battery 1 |
|---|---|---|---|---|---|---|---|
| | D15 | D16 | C17 | C18 | C19 | CLS | |
| Normal, 1st | High | High | Low | High | Low | off | — |
| Normal, 2nd | High | Low | High | Low | Low | on | Discharge |
| Critical, 1st | Low | High | Low | Low | High | on | Charge |
| Critical, 2nd | Abnormal | Low | Low | High | Low | off | — |

CHARGE DEVICE REDUCED IN SIZE AND POWER CONSUMPTION

BACKGROUND OF THE INVENTION

The present invention generally relates to a charge device, and particularly, to a charge device applicable to a semiconductor device, and more specifically, to a charge device adaptive for power supply, but reduced in size and power consumption.

DESCRIPTION OF THE RELATED ART

Recent years have observed a significant increase in proportion of electric apparatus that can work without connection to an outlet, as they have an incorporated battery, such as in a case of a portable video camera for example.

Such electric apparatus typically include an AC to DC adapter connectable to a service outlet, and are implemented to work on the one hand with power supplied through the adapter, as it is connected to the outlet, and on the other hand with power supplied from an incorporated battery, as the adapter is disconnected from the outlet.

Such the electric apparatus have an incorporated charge device for charging the battery through the adapter, as it is connected to the outlet.

FIG. 1 shows a typical conventional charge device.

In FIG. 1, designated at character 200 is the conventional charge device.

The charge device 200 comprises an adapter 2, an incorporated battery 1 to be charged, and a switching circuit Sw composed of a left switching circuit Sw1 and a right switching circuit Sw2 connected in parallel to each other. The left switching circuit Sw1 is constituted with a left power MOS circuit 31 and a resistor 43 connected thereto in series. The right switching circuit Sw2 is constituted with a right power MOS circuit 32.

The adapter 2 is provided with a pair of AC power input terminals 10 and 11 which are connectable to an unshown service outlet. The adapter 2 is connected at positive and negative voltage output terminals 2a and 2b thereof to a pair of DC power supply terminals of the charge device 200, i.e. to a positive (+) pole terminal 8 and a negative (−) pole terminal 9, respectively.

The battery 1 is connected at a positive (+) pole 1a thereof to the positive-side power supply terminal 8 of the device 200, and at a negative (−) pole 1b thereof to a positive end P of the switching circuit Sw, of which a negative end N is connected to the negative-side power supply terminal 9 of the device 200.

The charge device 200 further comprises a constant voltage source 7 having a reference voltage, an operation amplifier 4 as a first comparator connected at a non-inverted (+) input terminal 4a thereof via the voltage source 7 to the positive-side power supply terminal 8 and at an inverted (−) input terminal 4b thereof to the negative pole 1b of the battery 1, and a control circuit 30 connected at a first detection signal input terminal 30a thereof to an output terminal 4c of the first comparator 4 and at a second detection signal input terminal 30b thereof to a connection-state detection signal output terminal 2c of the adapter 2.

The charge device 200 still further comprises another constant voltage source 42 having a reference voltage, an operation amplifier 40 as a second comparator connected at a non-inverted (+) input terminal 40a thereof via the voltage source 42 to the negative-side power supply terminal 9 and at an inverted (−) input terminal 40b thereof to an interconnection 46 between the left power MOS circuit 31 and the resistor 43, a three-state buffer 37 interconnected between the negative-side power supply terminal 9 and a gate control terminal 31a of the MOS circuit 31, and another three-state buffer 38 interconnected between an output terminal 40c of the second comparator 40 and the gate control terminal 31a of the MOS circuit 31.

The three-state buffer 37 has a control signal input terminal 37a thereof connected to a first control signal output terminal 30c of the control circuit 30. The three-state buffer 38 has a control signal input terminal 38a thereof connected via an inverter 36 to the first control signal output terminal 30c of the control circuit 30. The control circuit 30 has a second control signal output terminal 30d thereof connected to a gate control terminal 32a of the right power MOS circuit 32.

In FIG. 1, the power supply terminals 8 and 9 can serve for supplying therethrough DC power to various electronic and electrical parts associated with the charge device 200. In other words, as the device 200 is incorporated in a portable video camera, respective eletronic and electrical parts of the camera will be all powered to work with a voltage supplied from between the positive side terminal 8 and the negative side terminal 9.

The adapter 2 works to supply a necessary DC voltage from the output terminals 2a and 2b thereof to the power supply terminals 8 and 9 of the device 200, when specified AC power is, serviced to the power input terminals 10 and 11 of the adapter 2. The adapter's terminals 10 and 11 can be plugged into the service outlet and may either be a power (+) and the other be a ground (−).

With the specified power serviced, the adapter 2 outputs a connection-state detection signal D16 at a high level from the detection signal output terminal 2c to the second input terminal 30b of the control circuit 30.

The control circuit 30 is supplied at the first input terminal 30a with a critical-state detection signal D15 from the first comparator 4.

The comparator 4 is connected at the non-inverted input terminal 4a to a negative pole of the constant voltage source 7 of which a positive pole connects to the positive-side power supply terminal 8, and at the inverted input terminal 4b to the negative pole 1b of the battery 1 of which the positive pole 1a connects to the power supply terminal 8.

Accordingly, the comparator 4 is cooperative with the constant voltage source 7 to constitute a detection circuit for detecting a critical state of the battery 1 such that, when a critical potential at the input terminal 4a that represents a positive potential at the terminal 8 minus the reference voltage of the voltage source 7 is exceeded by an increased potential P33 at the input terminal 4b that represents the positive potential at the terminal 8 minus a decreased battery voltage, the detection signal D15 output from the comparator 4 has a low level representative of a critical state in which the reduced battery voltage is lower than the reference voltage.

The left and right power MOS circuits 31 and 32 are both adapted to conduct a high-power current.

FIG. 2 shows internal circuitry of the power MOS circuits 31 and 32.

These circuits 31 and 32 each respectively comprise a total of n paralleled MOS transistors 60-1, 60-2, 60-3, 60-4, 60-5, ..., 60-i, ..., 60-(n−1) and 60-n of an N-channel type, where "n" is a positive integer and "i" is an arbitrary integer such that $1 \leq i \leq n$. The n transistors 60-i have their gates common-connected to the control terminal 31a or 32a to receive therethrough a later-described control signal.

The number n of MOS transistors 60-i may vary with various factors such as a capacity of the battery 1 and a total load of eletronic and electrical parts connected between the power supply terminals 8 and 9, and typically ranges over one hundred.

The MOS circuits 31 and 32 thus each respectively need not only a relatively large substrate area but also a provision of considerations for a relatively large heat dissipation, and usually are not integrated on a common semiconductor chip for other components of the charge device 200, but are formed as a separate component.

In the charge device 200, the control circuit 30 is responsible for the detection signal D15 input thereto from the comparator 4 to decide whether the battery voltage is equivalent to or larger than the reference voltage of the voltage source 7, i.e. if the battery 1 is operative to supply a necessary voltage through the power supply terminals 8 and 9, and for the detection signal D16 input thereto from the adapter 2 to decide whether the adapter 2 is connected to the service outlet, i.e. if the adapter 1 is operative to supply the necessary voltage through the power supply terminals 8 and 9.

The control circuit 30 is further responsible for a respective one of predetermined (four) combinations of results of such decisions to output a corresponding one of prerdetermined (three) combinations of high and low levels of a first control signal C34 from the first output terminal 30c and a second control signal C35 from the second output terminal 30d.

Description will be made of four probable cases of use of the charge device 200: a first normal case in which the battery voltage is not lower than the reference voltage of the voltage source 7 and hence a charge to the battery 1 is unnecessary, but the adapter 2 is connected to the service outlet; a second normal case in which the battery voltage is not lower than the reference voltage, either, so the adapter 2 is disconnected from the outlet, leaving the power supply to the battery 1; a first critical case in which the battery voltage is lower than the reference voltage and hence a charge to the battery 1 is needed, so the adapter 2 is connected to the outlet; and a second critical case in which the battery voltage is lower than the reference voltage, too, but the adapter 2 is disconnected from the outlet.

FIG. 3 shows a comparison between the four cases.

In the first normal case, both the critical-state detection signal D15 and the connection-state detection signal D16 have a high level.

With the high-level detection signals D15 and D16 input, the control circuit 30 provides the first control signal C34 at a high level and the second control signal C35 at a low level.

In response to the high-level first control signal C34, the three-state buffers 37 and 38 enter a conductive state and a non-conductive state, respectively, so that a negative potential at the power supply terminal 9 is applied as a third control signal C39 to the gate control terminal 31a of the power MOS circuit 31, turning off the n transistors 60-i in the circuit 31, i.e. turning off the left switching circuit Sw1.

The low-level second control signal C35 is directly applied to the gate control terminal 32a of the power MOS circuit 32, thus turning off the n transistors 60-i in the circuit 32, i.e. turning off the right switching circuit Sw2.

As the switching circuit Sw is turned off, the buttery 1 is isolated at the negative end from both the adapter 2 and the power supply terminal 9 so that it will not be charged through the adapter 2 nor discharge to external circuitry.

As a result, the adapter 2 serves to supply the necessary voltage through the power supply terminals 8 and 9.

In the first critical case, the critical-state detection signal D15 has a low level and the connection-state detection signal D16 has a high level.

With these detection signals D15 and D16 input, the control circuit 30 provides the first and second control signals C34 and C35 both at a low level.

Therefore, on the one hand, the low-level second control signal C35 is applied to the gate control terminal 32a of the right power MOS circuit 32, turning off the n transistors 60-i in this circuit 32, i.e. turning off the right switching circuit Sw2.

On the other hand, in response to the low-level first control signal C34, the three-state buffers 37 and 38 enter a non-conductive state and a conductive state, respectively, so that an output signal of the second comparator 40 is applied as the third control signal C39 to the gate control terminal 31a of the power MOS circuit 31.

The comparator 40 is connected at the non-inverted input terminal 40a to a positive pole of the constant voltage source 42 of which a negative pole connects to the power supply terminal 9, and at the inverted input terminal 40b to the interconnection 46 between the left power MOS circuit 31 and one end 43a of the resistor 43 of which another end 43b connects to the power supply terminal 9.

In other words, the comparator 40 is cooperative with the resistor 43 and the voltage source 42 to constitute a feedback circuit of the power MOS circuit 31, such that the control signal C39 output from the comparator 40 serves as a bias fixed to a voltage depending on the reference voltage of the voltage source 42.

Therefore, the power MOS circuit 31 is controlled to conduct therethrough a constant current I44 in accordance with the bias C39, so that the battery 1 is charged.

Accordingly, the adapter 2 concurrently serves for supplying the necessary voltage through the power supply terminals 8 and 9 and for charging the battery 1.

The resistor 43 needs to have a relatively low resistance for suppressing a heat dissipation due to consumed power, and would occupy a remarkably large substrate area, if it be integrated on a semiconductor substrate. It therefore is difficult to form the resistor 43 on the same semiconductor substrate as the power MOS circuit 31.

As a result, the resistor 43 is formed as a separate component.

In the second normal case, the critical-state detection signal D15 has a high level and the connection-state detection signal D16 has a low level.

With the detection signals D15 and D16 input, the control circuit 30 provides the first and second control signals C34 and C35 both at a high level.

In response to the high-level first control signal C34, the three-state buffers 37 and 38 enter the conductive state and the non-conductive state, respectively, so that the power MOS circuit 31 becomes non-conductive between positive and negative end terminals 31b and 31c thereof, i.e., the switching circuit Sw1 turns off, as described.

However, the high-level second control signal C35 is applied to the gate control terminal 32a of the right power MOS circuit 32, which circuit 32 is thus conductive between positive and negative end terminals 32b and 32c thereof and hence the switching circuit Sw2 is turned on, permitting a discharge current I45 from the battery 1 to be conducted therethrough.

The battery 1, which is now connected between the power supply terminals 8 and 9, supplies the necessary voltage via these terminals.

In the second critical case, the adapter 2 as well as the battery 1 fails to provide a sufficient voltage between the power supply terminals 8 and 9 so the critical-state detection signal D15 has an abnormal level and the connection-state detection signal D16 has a low level.

With these signals input, the control circuit 30 provides the first and second control signals C34 and C35 at a high level and a low level, respectively, like the first normal case.

Therefore, the power MOS circuits 31 and 32 both become non-conductive.

Concurrently therewith, associated electronic parts may be reset.

As will be understood from the foregoing description, in the conventional charge device 200, the power MOS circuits 31 and 32 of the switching circuit Sw are automatically controlled by the control circuit 30, to effect a charge to and a discharge from the battery 1, in accordance with a combination of a decision as to whether a battery voltage is lower than a reference voltage and another decision as to whether the adapter 2 is connected to an outlet.

However, in the conventional device 200, a constant current I44 for charging the battery 1 is conducted through the resistor 43, where remarkable power is consumed.

For a reduction of the power consumption, the resistor 43 needs to be low of resistance.

It therefore is difficult to form the resistor 43 on a semiconductor substrate on which the power MOS circuit 31 is formed.

Moreover, the conventional charge device 200 employs the two power MOS circuits 31 and 32 in the switching circuit Sw.

In this respect, the power MOS circuit 31 employed in the left switching circuit Sw1 needs an adapted capacity for conducting a sufficient current to charge the battery 1.

The power MOS circuit 32 employed in the right switching circuit Sw2 needs an adapted capacity for driving respective electronic and eletrical parts connected between the power supply terminals 8 and 9, as the battery 1 is connected at the negative pole 1b to the negative-side power supply terminal 9 in a short-circuiting manner.

Therefore, both the MOS circuits 31 and 32 are relatively large components, constituting an obstruction to a size reduction of a charge device.

The present invention has been achieved with such points in mind.

SUMMARY OF THE INVENTION

It therefore is an object of the present invention to provide a charge device with a reduced size and reduced power consumption.

To achieve the object, a genus of the present invention provides a charge device for a battery chargeable and dischargeable through a first battery terminal and a second battery terminal differernt of polarity from each other, the charge device comprising an adapter connectable to an AC power source to convert AC power received therefrom into DC power, a first power supply terminal connected to the first battery terminal and a DC output terminal of the adapter, a second power supply terminal connected to another DC output terminal of the adapter, a switching circuit interconnected between the second battery terminal and the second power supply terminal, the switching circuit being controllable with a control signal for a switching thereof and for limiting a current passing therethrough, the switching circuit having a resistor for conducting a fraction of the passing current to provide a current detection signal representative of the conducting fraction of the passing current, and control circuitry for responding to a combination of a first detection signal representative of a potential difference between the first and second battery terminals, a second detection signal representative of a connection state of the adapter to the AC power source and the current detection signal to provide the switching circuit with the control signal.

According to the genus of the invention, when an adapter is connected to an AC power source, AC power from the power source is converted by the adapter into DC power, which may be supplied via first and second power supply terminals to external electtronic or electric parts and/or may be employed to charge a battery by conducting a charge current on the one hand between a DC output terminal of the adapter and a first battery terminal and on the other hand between another DC output terminal of the adapter and a second battery terminal, as a current-limitting switching circuit is permitted to turn on in accordance with a control signal output from control circuitry in response to a first detection signal representative of a potential difference between the first and second battery terminals, a second detection signal representative of a connection state of the adapter to the power source and a current detection signal respresentative a fraction of the charge current passing the switching circuit, which current fraction is conducted through a resistor.

When the adapter is disconnected from the power source, the battery may discharge via the battery terminals and power supply terminals, as the switching circuit is permitted to turn on in accordance with the control signal, thus conducting a fraction of a discharge current through the resistor.

Therefore, according to the genus of the invention, a charge device with a single switching circuit is adapted for both charge and discharge, thus permitting a size reduction in comparison with a conventional device needing a pair of switching circuits either for a charge current and the other for a discharge current.

Moreover, a current detection is effected by a resistor with a resistance determined simply for conducting a minute fraction of charge or discharge current, thus permitting a resistor formation on the same chip as the switching circuit, resulting in a still reduced size as well as a remarkably reduced power consumption and hence of heat dissipation, without the need of a conventional provision of a large heat radiation area, so that a device area may be reduced to about half a conventional area.

According to a species of the genus of the invention, the switching circuit comprises a multiplicity of MOS transistors having gate electrodes thereof connected to a first common terminal for receiving the control signal, drain electrodes thereof connected to a second common terminal connected to the second battery terminal and source electrodes thereof connected to a third common terminal connected to the second power supply terminal, and another MOS transistor having a gate electrode thereof connected to the first common terminal, a drain electrode thereof connected to the second common terminal and a source electrode thereof connected via the resistor to the third common terminal.

According to an individual of the species of the invention, the control circuitry comprises a first buffer interconnected between the first common terminal and the first power supply terminal, a second buffer interconnected between the first common terminal and the second power supply terminal, a third buffer interconnected between the first common terminal and a comparison means for comparing a voltage drop across the resistor with a reference voltage, and a control circuit for responding to the combination of the first and second detection signals to control the first, second and third buffers so that the control signal is output to the switching circuit.

According to another species of the genus of the invention, the control circuitry comprises a microcomputer connected between the first and second power supply terminals.

Further to achieve the object, another genus of the present invention provides a charge device comprising a battery connected between a first power supply terminal and a first contact, a first transistor connected between the first contact and a second contact, a resistor connected between the second contact and a second power supply terminal, a second transistor connected between the first contact and the second power supply terminal, an operation amplifier having an inverted input terminal thereof connected to the second contact and a non-inverted input terminal thereof connected to a constant voltage source, and potential providing means for providing respective gates of the first and second transistors with one of an electric potential at the first power supply terminal, an electric potential at the second power supply terminal and an electric potential at an output of the operation amplifier.

According to a species of this genus of the invention, the charge device further comprises an adapter having a positive pole and a negative pole, the adapter being operative to provide a voltage between the first and second power supply terminals, as a voltage is applied between the positive pole and the negative pole.

According to an individual of this species of the invention, the adapter generates a detection signal, as the voltage is applied between the positive pole and the negative pole, and the potential providing means responds to a combination of an electric potential at the first contact and the detection signal to provide the respective gates of the first and second transistors with the above-said one of the electric potential at the first power supply terminal, the electric potential at the second power supply terminal and the electric potential at the output of the operation amplifier.

Furthermore, to achieve the object, another genus of the present invention provides a charge device comprising a battery connected between a first power supply terminal and a contact, a transistor connected between the contact and a second power supply terminal, an adapter connected between the first and second power supply terminals, a first detection means for comparing a voltage of the battery and a voltage of a constant voltage source to detect which thereof is higher, a second detection means for detecting whether or not the adapter is supplying a voltage between the first and second power supply terminals, and a control means for responding detection results of the first and second detection means to provide a gate of the transistor with one of an electric potential at the first power supply terminal, an electric potential at the second power supply terminal and a bias potential between the electric potential at the first power supply terminal and the electric potential at the second power supply terminal.

According to a species of this genus of the invention, the control means provides the gate of the transistor with the electric potential at the first power supply terminal, as the first detection means detects that the voltage of the battery is higher than the voltage of the constant voltage source and the second detection means detects that the adapter is supplying no voltage between the first and second power supply terminals, with the electric potential at the second power supply terminal, as the first detection means detects that the voltage of the battery is higher than the voltage of the constant voltage source and the second detection means detects that the adapter is supplying the voltage between the first and second power supply terminals, and with the bias potential between the electric potential at the first power supply terminal and the electric potential at the second power supply terminal, as the first detection means detects that the voltage of the constant voltage source is higher than the voltage of the battery and the second detection means detects that the adapter is supplying the voltage between the first and second power supply terminals.

Still more, to achieve the object, another genus of the present invention provides a charge device comprising a battery connected between a first power supply terminal and a first contact, a first transistor connected between the first contact and a second contact, a resistor connected between the second contact and a second power supply terminal, a second transistor connected between the first contact and the second power supply terminal, an adapter having a positive pole and a negative pole, the adapter being operative to provide a voltage between the first and second power supply terminals and generate a detection signal, as a voltage is applied between the positive pole and the negative pole, a first operation amplifier having an inverted input terminal thereof connected to the first contact and a non-inverted input terminal thereof connected to a first constant voltage source, a second operation amplifier having an inverted input terminal thereof connected to the second contact and a non-inverted input terminal thereof connected to a second constant voltage source, a control means for responding to a combination of an output signal of the first operation amplifier and the detection signal to provide an active level to one of first, second and third control signals, a first buffer for responding to the active level of the first control signal to interconnect the first power supply terminal with respective gates of the first and second transistors, a second buffer for responding to the active level of the second control signal to interconnect the second power supply terminal with the respective gates of the first and second transistors, and a third buffer for responding to the active level of the third control signal to interconnect an output terminal of the second operation amplifier with the respective gates of the first and second transistors.

Yet more, to achieve the object, another genus of the present invention provides a charge device including a battery chargeable and dischargeable, an adapter terminal connectable to a power source terminal and a first terminal for supplying electric power to electric apparatus, wherein a single gate signal controls a block connected between the battery and the first terminal for limiting a current, the block having incorporated therein a resistor for detecting the current.

BRIEF DESCRIPTION OF THE DRAWINGS

The objects, features and advantages of the present invention will become more apparent from consideration of the following detailed description, in conjunction with the accompanying drawings, in which:

FIG. 3 is a table for comparing probable cases of use of the charge device of FIG. 1;

FIG. 6 is a table for comparing probable cases of use of the charge device of FIG. 3.

DESCRIPTION OF THE PREFERRED EMBODIMENTS

Figure 1:
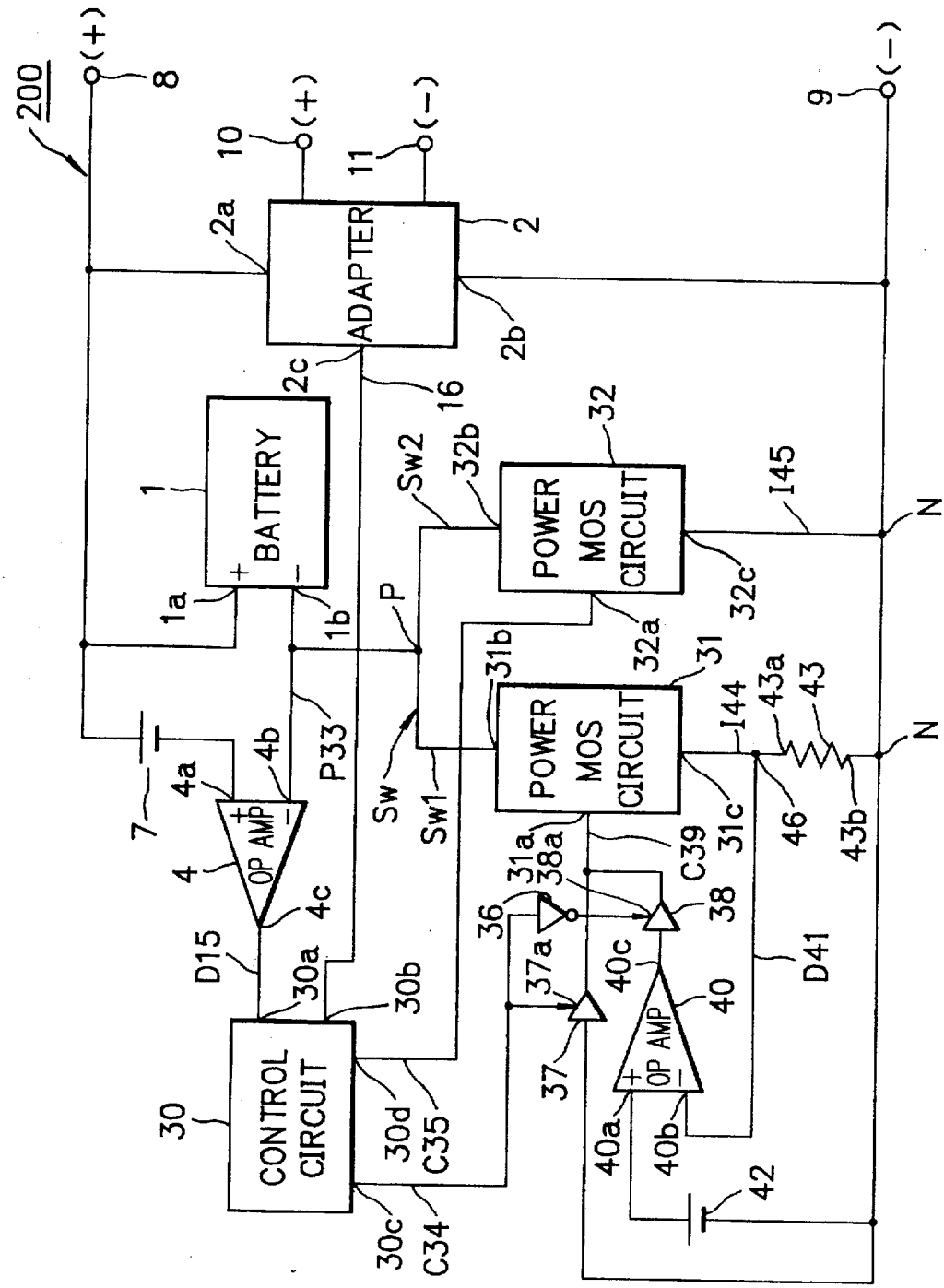
FIG. 1 is a block diagram of a conventional charge device.
Figure 2:
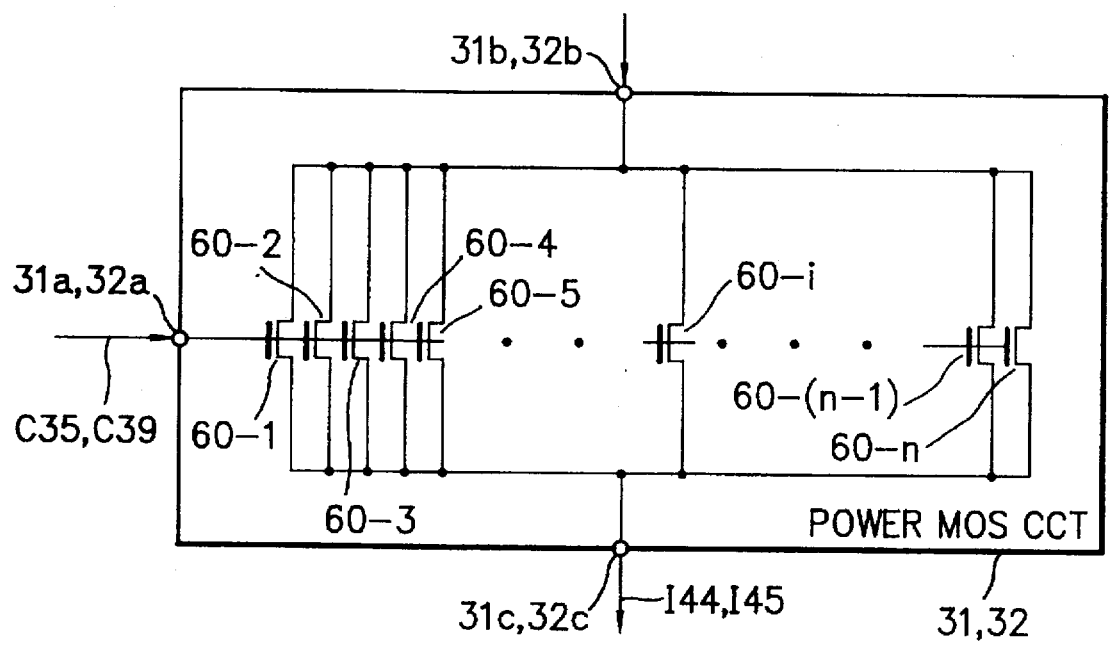
FIG. 2 is a circuit diagram of a power MOS circuit of the charge device of FIG. 1.

There will be detailed below preferred embodiments of the present invention, with reference to FIGS. 4 and 5. Like members to FIGS. 1 and 2 are designated by like reference characters.

Figure 4:
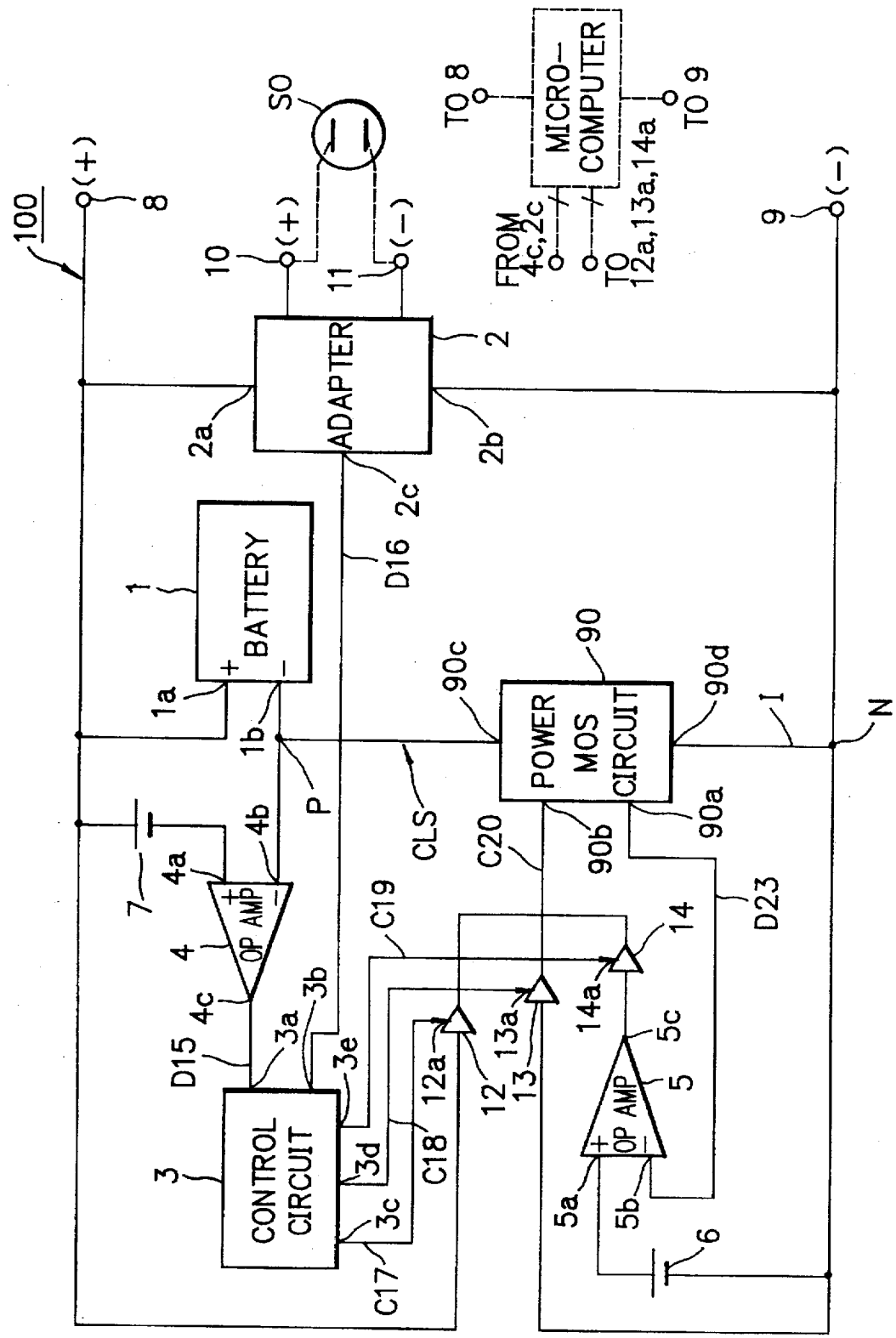
FIG. 4 is a block diagram of a charge device according to an embodiment of the invention and a central processing unit according to a modification of the embodiment.

FIG. 4 shows a charge device 100 according to an embodiment of the invention.

The charge device 100 comprises an adapter 2 for converting AC power having a nomial voltage as an effective voltage within a specified voltage variation range and a specified frequency into DC power having a specified voltage as a regulated voltage (hereafter sometimes "necessary voltage") to be output within a specified voltage variation range, an incorporated battery 1 chargeable at least to the necessary voltage and dischargeable within a specified voltage range including the necessary voltage, and a current limiting switch circuit CLS composed of a power MOS circuit 90.

The adapter 2 is connectable via AC power input terminals 10 and 11 thereof to a service outlet SO as an AC power source for supplying the AC power having an effective voltage within the specified voltage range and the specified frequency. The adapter 2 is connected at positive and negative voltage output terminals 2a and 2b thereof to a pair of DC power supply terminals, i.e. to a positive (+) pole terminal 8 and a negative (−) pole terminal 9, respectively.

The battery 1 is connected at a positive (+) pole 1a thereof to the positive-side power supply terminal 8, and at a negative (−) pole 1b thereof to a positive end P of the switch circuit CLS, of which a negative end N is connected to the negative-side power supply terminal 9.

The charge device 100 further comprises a constant voltage source 7 having a reference voltage, an operation amplifier 4 as a first comparator connected at a non-inverted (+) input terminal 4a thereof via the voltage source 7 to the positive-side power supply terminal 8 and at an inverted (−) input terminal 4b thereof to the negative pole 1b of the battery 1, and a control circuit 3 connected at a first detection signal input terminal 3a thereof to an output terminal 4c of the first comparator 4 and at a second detection signal input terminal 3b thereof to a connection-state detection signal output terminal 2c of the adapter 2.

The charge device 100 still further comprises another constant voltage source 6 having a reference voltage, an operation amplifier 5 as a second comparator connected at a non-inverted (+) input terminal 5a thereof via the voltage source 6 to the negative-side power supply terminal 9 and at an inverted (−) input terminal 5b thereof to a current-magnitude detection signal output terminal 90a of the power MOS circuit 90, and a triple of three-state buffers: a first three-state buffer 12 interconnected between the positive-side power supply terminal 8 and a control signal input terminal 90b of the power MOS circuit 90; a second three-state buffer 13 interconnected between the negative-side power supply terminal 9 and the control signal input terminal 90b of the circuit 90; and a third three-state buffer 14 interconnected between an output terminal 5c of the second comparator 5 and the control signal input terminal 90b.

The first buffer 12 has a control signal input terminal 12a thereof connected to a first control signal output terminal 3c of the control circuit 3. The second buffer 13 has a control signal input terminal 13a thereof connected to a second control signal output terminal 3d of the control circuit 3. The third buffer 14 has a control signal input terminal 14a thereof connected to a third control signal output terminal 3e of the control circuit 3.

In the charge device 100 of FIG. 4, the battery 1, the adapter 2, the first comparator 4 and the constant voltage source 7 have the same functions as those in the charge device 200 of FIG. 1.

Therefore, the control circuit 3 is supplied at the first input terminal 3a with a critical-state detection signal D15 from the output terminal 4c of the first comparator 4 and at the second input terminal 3b with a connection-state detection signal D16 from the output terminal 2c of the adapter 2.

The power MOS circuit 90 is adapted to conduct a high-power current.

Figure 5:
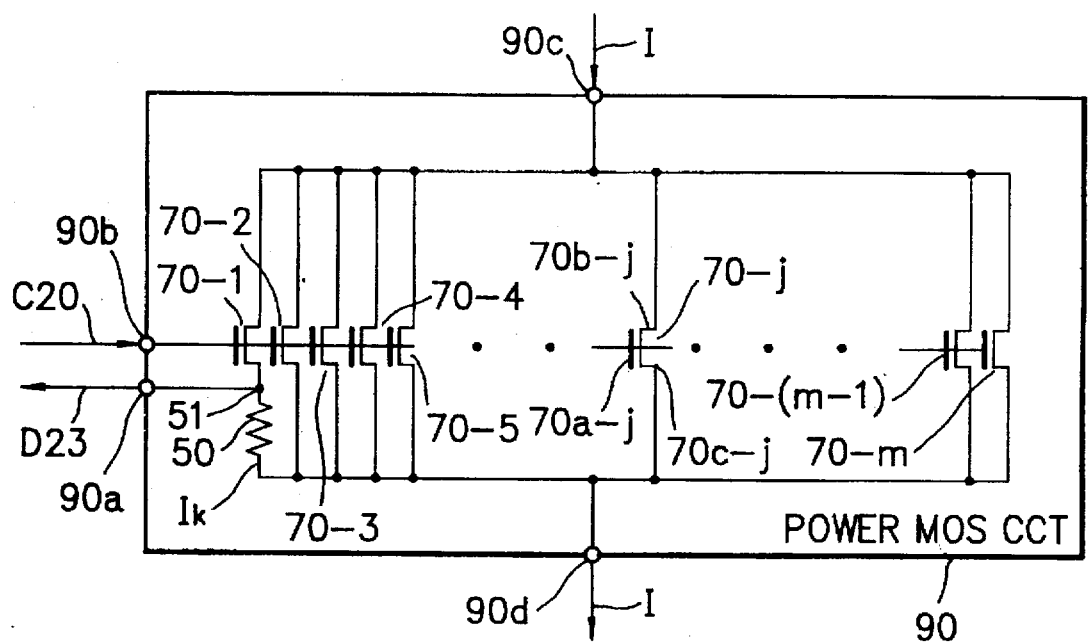
FIG. 5 is a circuit diagram of a power MOS circuit of the charge device of FIG. 3.

FIG. 5 shows internal circuitry of the power MOS circuit 90.

The circuit 90 comprises a total of m paralleled substantially identical MOS transistors 70-1, 70-2, 70-3, 70-4, 70-5, ..., 70-j, ..., 70-(m−1) and 70-m of an N-channel type, where "m" is a positive integer and "j" is an arbitrary integer such that $1 \leq i \leq m$.

The number m of MOS transistors 70-j may vary with various factors such as a capacity of the battery 1 and a total load of eletronic and electrical parts connected between the power supply terminals 8 and 9, like the case of the conventional device 200.

Each MOS transistor 70-j has a gate electrode 70a-j thereof common-connected to the control signal input terminal 90b of the power MOS circuit 90 to receive therethrough a later-described control signal C20, and a drain electrode 70b-j thereof connected to a common current terminal 90c at a positive side of the MOS circuit 90.

Respective MOS transistors 70-j are connected at their source electrodes 70c-j to a common current terminal 90d at a negative side of the circuit 90, except a particular one 70-k ($1 \leq k \leq m$; k=1 in FIG. 4) of which the source electrode 70c-k connects via a current-magnitude detecting resistor 50 to the common terminal 90d.

An interconnection 51 between the source electrode 70c-k of the particular MOS transistor 70-k and the resistor 50 is connected to the detection signal output terminal 90a of the power MOS circuit 90, to output therethrough a current-magnitude detection signal D23 as a voltage signal respresentative of a magnitutde of a current being conducted through the resistor 50, i.e. a current Ik passing the MOS transistor 70-k, which is substantially equivalent to one m-th (I/m) of a total conducted current I through the circuit 90.

In the charge device 100, the control circuit 3 is responsible for the detection signal D15 from the comparator 4 to decide whether a battery voltage, i.e. a potential difference developed across the battery 1, is equivalent to or larger than the reference voltage of the voltage source 7, and for the detection signal D16 from the adapter 2 to decide whether the adapter 2 is connected to the service outlet SO.

The control circuit 3 is further responsible for a respective one of predetermined (four) combinations of results of such decisions to output a corresponding one of prerdetermined (three) combinations of high and low levels of a first control signal C17 from the first output terminal 3c, a second control signal C18 from the second output terminal 3d and a third control signal C19 from the second output terminal 3e.

Like the conventional device 200, description will be made of four probable cases of use of the charge device 100: a first normal case in which the battery voltage is not lower than the reference voltage of the voltage source 7, but the adapter 2 is connected to the outlet SO; a second normal case in which the battery voltage is not lower than the reference voltage, either, so the adapter 2 is disconnected from the outlet SO; a first critical case in which the battery voltage is lower than the reference voltage, so the adapter 2 is connected to the outlet SO; and a second critical case in which the battery voltage is lower than the reference voltage, too, but the adapter 2 is disconnected from the outlet SO.

FIG. 6 shows a comparison between the four cases.

In the first normal case, both the critical-state detection signal D15 and the connection-state detection signal D16 have a high level.

With the high-level detection signals D15 and D16 input, the control circuit 3 provides the second control signal C18 at a high level and the first and third control signals C17 and C19 both at a low level.

In response to the high-level second control signal C18, the second three-state buffer 13 enters a conductive state. In response to the low-level first and third control signals C17 and C19, the first and third three-state buffers 12 and 14 enter a non-conductive state, respectively.

Therefore, a (ground) potential at the negative-side power supply terminal 9 is applied as the control signal C20 to the gate control terminal 90b of the power MOS circuit 90.

In other words, the m MOS transistors 70-j in the circuit 90 are grounded at their gates 70a-j and hence are all turnd off, so that the battery 1 is isolated or cut off at the negative pole 1b from both the adapter 2 and the negative-side power supply terminal 9.

Accordingly, the battery 1 is kept from being charged or discharging, i.e. protected from an over-charge and prevented of a leaking discharge, and will hold a quantity of charged electricities without reduction.

As a result, the adapter 2 serves to supply a necessary voltage through the power supply terminals 8 and 9.

In the first critical case, the critical-state detection signal D15 has a low level and the connection-state detection signal D16 has a high level.

With these detection signals D15 and D16 input, the control circuit 3 provides the third control signal C19 at a high level and the first and second control signals C17 and C18 both at a low level.

In response to the high-level third control signal C19, the third three-state buffer 14 enters a conductive state. In response to the low-level first and second control signals C17 and C18, the first and second three-state buffers 12 and 13 enter a non-conductive state, respectively.

Therefore, an output signal of the second comparator 5 is applied as the control signal C20 to the gate control terminal 90b of the power MOS circuit 90.

The comparator 5 is connected at the non-inverted input terminal 5a to a positive pole of the constant voltage source 6 of which a negative pole connects to the power supply terminal 9, and at the inverted input terminal 5b via the current-magnitude detection signal output terminal 90a of the power MOS circuit 90 to the interconnection 51 between the MOS transistor 70-k and one end of the resistor 50 of which another end connects to the power supply terminal 9.

In other words, the comparator 5 is cooperative with the resistor 50 and the voltage source 6 to constitute a feedback circuit of the transistor 70-k and hence of the power MOS circuit 90, such that the control signal C20 from the comparator 5 serves for the m transistors 70-j including the particular one 70-k, as a bias thereto fixed to a voltage depending on the reference voltage of the voltage source 6.

Therefore, the power MOS circuit 90 is controlled to conduct therethrough a constant current I in accordance with the bias C20, so that the battery 1 is charged.

Accordingly, the adapter 2 concurrently serves for supplying the necessary voltage through the power supply terminals 8 and 9 and for charging the battery 1.

In the second normal case, the critical-state detection signal D15 has a high level and the connection-state detection signal D16 has a low level.

With the detection signals D15 and D16 input, the control circuit 3 provides the first control signal C17 at a high level and the second and third control signals C18 and C19 both at a low level.

In response to the high-level first control signal C17, the first three-state buffer 12 enters a conductive state. In response to the low-level second and third control signals C18 and C19, the second and third three-state buffers 13 and 14 enter a non-conductive state, respectively.

Therefore, a potential at the positive-side power supply terminal 8 is applied as the control signal C20 to the gate control terminal 90b of the power MOS circuit 90.

The applied potential from the positive-side power supply terminal 8 is higher than the above-mentioned bias, enough to completely turn on the m transistors 70-j of the power MOS circuit 90 so that the battery 1 is connected at the negative pole 1b to the negative-side power supply terminal 9 in a short-circuiting manner.

The battery 1, which is now connected between the power supply terminals 8 and 9, discharges via these terminals, supplying the necessary voltage.

In the second critical case, the adapter 2 as well as the battery 1 fails to provide a sufficient voltage between the power supply terminals 8 and 9 so the critical-state detection signal D15 has an abnormal level and the connection-state detection signal D16 has a low level.

With these signals input, the control circuit 3 provides the second control signal C18 at a high level and the first and third control signals C17 and C19 both at a low level, like the first normal case.

Therefore, the power MOS circuit 90 becomes non-conductive, thus preventing the battery 1 from an over-discharge.

Concurrently therewith, associated electronic parts may be reset.

As will be understood from the foregoing description, in the charge device 100 according to the present embodiment, a resistor 50 is interconnected between a particular one 70-k of m transistors 70-j of a power MOS circuit 90 and a negative-side power supply terminal 9, thereby constituting part of a feedback circuit, permitting an incorporated battery 1 to be charged as well as to discharge under an automatic control, without the need of an extra power MOS circuit such as the right power MOS circuit 32 of the conventional charge device 200.

Moreover, assuming that the resistor 50 of the device 100 has an identical resistance to the resistor 43 of the device 200 and that in the first critical case the power MOS circuit 90 of the device 100 conducts therethrough an identical current I (=I44) to the left power MOS circuit 31 of the device 200, the resistor 50 will consume as low power as $(1/m)^2$ of consumed power at the resistor 43, thus achieving a remarkable reduction of power consumption, during a charge to the battery 1.

Further, along with a discharge from the battery 1, the resistor 50 will not consume much power, thus permitting a great reduction of power consumtion, as a whole.

Therefore, a resultant reduction of heat dissipation permits the resistor 50 to be formed on a semiconductor substrate on which the m transistors 70-j of the power MOS circuit 90 are formed.

It will be seen that the members 3, 4, 5, 6, 12, 13 14 constitute a control circuit in a wide sense for the current-limiting switch circuit CLS. The control circuit in the wide sense may be fabricated as a module or may comprise a microcomputer.

Moreover, the buffers 12, 13, 14 may be replaced by appropriate switching members.

Further, the detection of a critical state of the battery 1 as well as the charge current control and the switching of the circuit CLS may be effected at a positive pole end of the battery 1.

Incidentally, in the charge device 100, the control circuit 3 may preferably comprise a decoder circuit for responding to the detection signals D15 and D16 to provide the control signals C17, C18 and C19.

As shown in FIG. 4, in a modification, such the decoder may be replaced by a microcomputer 3' connected between a pair of power supply terminals 8 and 9, to control a power MOS circuit 90 as the control circuit 3 will do.

In this modification, even when a battery voltage is lower than a reference voltage of a constant voltage source 7, with an adapter 2 disconnected from a service outlet SO, the microcomputer 3' may operate with supplied voltages lower than the reference voltage, within a predetermined working voltage range thereof.

In this case, the microcomputer 3' may preferably be adapted to respond to a combination of levels of a critical-state detection signal D15 (from 4c) and a connection-state detection signal D16 (from 2c) to output a combination of levels of first, second and third control signals C17, C18 and C19 (to 12a, 13a and 14a) for controlling a bias circuit 12-13-14 of the power MOS circuit 90 so that, as the adapter 2 is disconnected from the outlet SO, an incorporated battery 1 may serve on the one hand to keep supplying a decreasing voltage under the reference voltage via the power supply terminals 8 and 9 and on the other hand to have the comparator 4 held operative to generate the detection signal D15 at a corresponding low level, until a predetermined time period, with which the battery voltage may go down to a lower limit of the working voltage range of the microcomputer 3', elapses after the battery voltage has become lower than the reference voltage, whereby the microcomputer 3' may avoid undergoing a sudden power failure due to a reduced battery voltage.

In the embodiment of FIG. 4, the power MOS circuit 90 may be replaced by a total of m paralleled bipolar transistors consisting of a total of m−1 bipolar transistors having a large current-supply capacity equivalent to each MOS transistor 70-j, and a single bipolar transistor having a small current-supply capacity and connected to the resistor 51.

It will be seen that the m MOS transistors 70-j may have their current-supply capacities different therebetween, the MOS transistor 70-k may have a relatively small capacity, another resistor may be interconnected between one MOS transistor 70-p ($1 \leq p \leq m$; $p \neq k$) and the negative-side power supply terminal 9, and an interconnection between this resistor and the MOS transistor 70-p may be connected to the current-maginitude detection signal output terminal 90a of the power MOS circuit 90.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A charge device for a battery chargeable and dischargeable through a first battery terminal and a second battery terminal differernt of polarity from each other, the charge device comprising:

an adapter connectable to an AC power source to convert AC power received therefrom into DC power;

a first power supply terminal connected to the first battery terminal and a DC output terminal of the adapter;

a second power supply terminal connected to another DC output terminal of the adapter;

a switching circuit interconnected between the second battery terminal and the second power supply terminal, the switching circuit being controllable with a control signal for a switching thereof and for limiting a current passing therethrough, the switching circuit having a resistor for conducting a fraction of the passing current to provide a current detection signal representative of the conducting fraction of the passing current; and control circuitry for responding to a combination of a first detection signal representative of a potential difference between the first and second battery terminals, a second detection signal representative of a connection state of the adapter to the AC power source and the current detection signal to provide the switching circuit with the control signal.

2. A charge device according to claim 1, wherein the switching circuit comprises:

a multiplicity of MOS transistors having gate electrodes thereof connected to a first common terminal for receiving the control signal, drain electrodes thereof connected to a second common terminal connected to the second battery terminal and source electrodes thereof connected to a third common terminal connected to the second power supply terminal; and another MOS transistor having a gate electrode thereof connected to the first common terminal, a drain electrode thereof connected to the second common terminal and a source electrode thereof connected via the resistor to the third common terminal.

3. A charge device according to claim 2, wherein the control circuitry comprises:

a first buffer interconnected between the first common terminal and the first power supply terminal;

a second buffer interconnected between the first common terminal and the second power supply terminal;

a third buffer interconnected between the first common terminal and a comparison means for comparing a voltage drop across the resistor with a reference voltage; and a control circuit for responding to the combination of the first and second detection signals to control the first, second and third buffers so that the control signal is output to the switching circuit.

4. A charge device according to claim 1, wherein control circuitry comprises a microcomputer connected between the first and second power supply terminals.

5. A charge device comprising:

a battery connected between a first power supply terminal and a first contact;

a first transistor connected between the first contact and a second contact;

a resistor connected between the second contact and a second power supply terminal;

a second transistor connected between the first contact and the second power supply terminal;

an operation amplifier having an inverted input terminal thereof connected to the second contact and a non-inverted input terminal thereof connected to a constant voltage source; and potential providing means for providing respective gates of the first and second transistors with one of an electric potential at the first power supply terminal, an electric potential at the second power supply terminal and an electric potential at an output of the operation amplifier.

6. A charge device according to claim 5, further comprising an adapter having a positive pole and a negative pole, the adapter being operative to provide a voltage between the first and second power supply terminals, as a voltage is applied between the positive pole and the negative pole.

7. A charge device according to claim 6, wherein the adapter generates a detection signal, as the voltage is applied between the positive pole and the negative pole, and wherein the potential providing means responds to a combination of an electric potential at the first contact and the detection signal to provide the respective gates of the first and second transistors with said one of the electric potential at the first power supply terminal, the electric potential at the second power supply terminal and the electric potential at the output of the operation amplifier.

8. A charge device comprising:

a battery connected between a first power supply terminal and a contact;

a transistor connected between the contact and a second power supply terminal;

an adapter connected between the first and second power supply terminals;

a first detection means for comparing a voltage of the battery and a voltage of a constant voltage source to detect which thereof is higher;

a second detection means for detecting whether or not the adapter is supplying a voltage between the first and second power supply terminals; and a control means for responding detection results of the first and second detection means to provide a gate of the transistor with one of an electric potential at the first power supply terminal, an electric potential at the second power supply terminal and a bias potential between the electric potential at the first power supply terminal and the electric potential at the second power supply terminal.

9. A charge device according to claim 8, wherein the control means provides the gate of the transistor:

with the electric potential at the first power supply terminal, as the first detection means detects that the voltage of the battery is higher than the voltage of the constant voltage source and the second detection means detects that the adapter is supplying no voltage between the first and second power supply terminals;

with the electric potential at the second power supply terminal, as the first detection means detects that the voltage of the battery is higher than the voltage of the constant voltage source and the second detection means detects that the adapter is supplying the voltage between the first and second power supply terminals; and with the bias potential between the electric potential at the first power supply terminal and the electric potential at the second power supply terminal, as the first detection means detects that the voltage of the constant voltage source is higher than the voltage of the battery and the second detection means detects that the adapter is supplying the voltage between the first and second power supply terminals.

10. A charge device comprising:

a battery connected between a first power supply terminal and a first contact;

a first transistor connected between the first contact and a second contact;

a resistor connected between the second contact and a second power supply terminal;

a second transistor connected between the first contact and the second power supply terminal;

an adapter having a positive pole and a negative pole, the adapter being operative to provide a voltage between the first and second power supply terminals and generate a detection signal, as a voltage is applied between the positive pole and the negative pole;

a first operation amplifier having an inverted input terminal thereof connected to the first contact and a non-inverted input terminal thereof connected to a first constant voltage source;

a second operation amplifier having an inverted input terminal thereof connected to the second contact and a non-inverted input terminal thereof connected to a second constant voltage source;

a control means for responding to a combination of an output signal of the first operation amplifier and the detection signal to provide an active level to one of first, second and third control signals;

a first buffer for responding to the active level of the first control signal to interconnect the first power supply terminal with respective gates of the first and second transistors;

a second buffer for responding to the active level of the second control signal to interconnect the second power supply terminal with the respective gates of the first and second transistors; and a third buffer for responding to the active level of the third control signal to interconnect an output terminal of the second operation amplifier with the respective gates of the first and second transistors.

11. A charge device including a battery chargeable and dischargeable, an adapter terminal connectable to a power source terminal and a first terminal for supplying electric power to electric apparatus, wherein:

a single gate signal controls a block connected between the battery and the first terminal for limiting a current, the block having incorporated therein a resistor for detecting the current.

* * * * *